Figure 1:
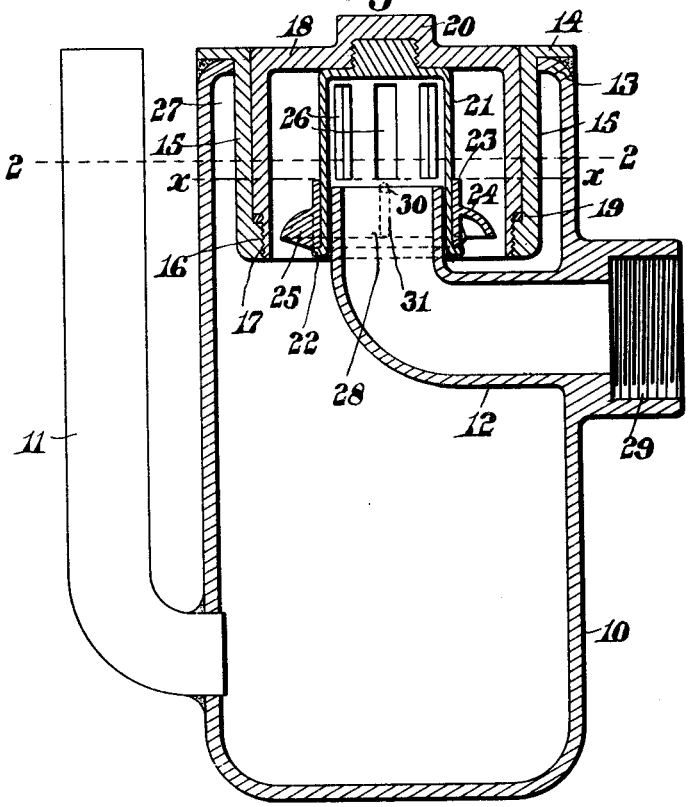

T. E. CROSBY.
TRAP.
APPLICATION FILED MAY 11, 1914.

1,123,495.

Patented Jan. 5, 1915.

Witnesses:
Roswell F. Hatch
Mary C. Smith

Inventor:
Thomas E. Crosby,
by Walter E. Lombard,
Atty.

UNITED STATES PATENT OFFICE.

THOMAS E. CROSBY, OF ALLSTON, MASSACHUSETTS.

TRAP.

1,123,495.   Specification of Letters Patent.   Patented Jan. 5, 1915.

Application filed May 11, 1914. Serial No. 838,430.

*To all whom it may concern:*

Be it known that I, THOMAS E. CROSBY, a citizen of the United States of America, and a resident of Allston, in the county of Suffolk and State of Massachusetts, have invented certain new and useful Improvements in Traps, of which the following is a specification.

This invention relates to improvements in anti-siphon grease or bath traps in which automatic means is provided to prevent siphoning of the trap by water under any pressure, together with means for readily opening the trap and cleaning the same.

The invention pertains especially to traps such as are in general use in connection with plumbing fixtures, which is simple in construction and possesses advantages over traps in general use.

One of the objects of the invention is to provide a trap which has an inverted cup provided with a depending portion having means for retarding the flow of water and preventing any consequent siphonage, extending from the base of the cup down into the trap.

Another object is to provide a trap having the outlet above the seal, which in traps of this kind is below the seal.

Another object is to provide a trap having a water shield attached to the depending portion of the cover adapted to retard the flow of water and in order to further retard the flow of water, especially the circular motion of the water, this shield is provided with a plurality of downwardly extending blades.

Another object is to provide a trap having a strainer so constructed that the water will freely pass through the openings therein, but any articles or substances which might clog the outlet-pipe will be prevented from entering the strainer and will be retained in the trap.

Another object is to provide a trap having an automatic water shield for retarding the flow of water and preventing consequent siphonage, which automatically adjusts itself to the pressure of the water in the trap and which reduces and enlarges automatically the openings in the strainer, thereby varying with the pressure the volume of water permitted to pass into the outlet-pipe.

Another object is to provide a trap having a removable cover and inverted cup to which may be attached the various improvements embodied in my invention, the trap being entirely free from all attachments and obstructions and by having the means for unscrewing the trap-screw above the floor may be readily emptied or plunged in cleaning the same in case of stoppage.

The invention consists in certain novel features of construction and arrangement of parts which will be fully understood by reference to the description of the drawings and to the claims hereinafter given.

Figure 2:
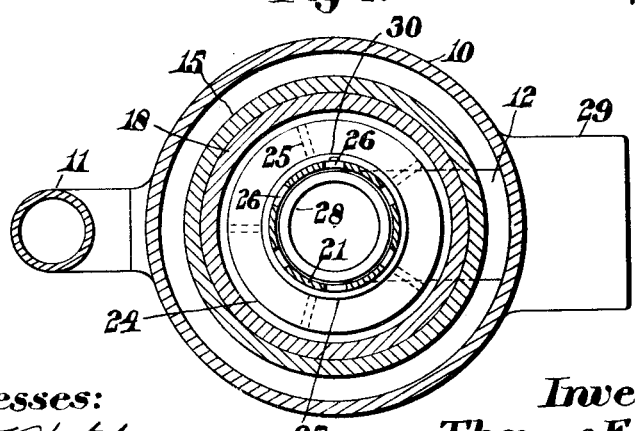

Of the drawings: Figure 1 represents a central vertical section of the improved automatic, anti-siphon trap, and Fig. 2 represents a horizontal section of the same, the cutting plane being on line 2—2 of Fig. 1.

Similar characters designate like parts throughout the several figures of the drawings.

In the drawings, 10 is a trap provided with an inlet pipe 11 and an outlet pipe 12, the former communicating with the trap near the base thereof. The upper end of the trap 10 is provided with an inwardly extending flange 13 upon which rests an outwardly extending flange 14 of an inner casing member 15. The lower end of this inner casing member 15 is provided with a threaded opening 16 into which is secured the threaded lower end 17 of the cup-shaped cover 18. A washer 19 surrounds the reduced end 17 of the cover 18 and prevents leakage between the cover and the inner casing member 15 and serves to make the trap air tight. The upper face of the cover 18 is flush with the floor and with the upper face of the flanged end 14 of the inner casing 15. The cover 18 is removed by means of the flat-sided lug or key 20. Threaded to the inner face of the cover 18 is a depending tubular member 21, the lower end of which has an outwardly extending flange 22 upon which is adapted to rest the collar 23 surrounding and loosely fitting said member 21. This collar 23 is provided with a downwardly extending curved apron 24 the inner face of which is connected to the outer face of the collar 23 by a plurality of radial blades 25. Normally the collar 23 is retained to its seat on the flange 22 by its own weight. When the cover 18 is removed and the member 21 disconnected therefrom, the collar 23 may be placed in position on said member 21 or removed therefrom.

Above the upper edge of the collar 23 the member 21 is provided with a plurality of vertical slits or openings 26, these openings serving as a strainer and preventing any clogging of the outlet pipe 12. The curved plate or apron 24 forms a water shield and this shield with the blades 25 is adapted to retard the flow of water and prevent siphoning. An air space 27 between the outer casing 10 of the trap and the inner casing 15 aids in preventing siphoning. The water shield 24 may be placed in position on the collar 23 either in the preferred form as shown or at the upper edge of the collar.

The base of the tubular portion 21 is adapted to pass freely over the upper end 28 of the outlet pipe or elbow 12. This outlet pipe may be formed integral with the outer casing member 10 of the trap or it may be made separate therefrom or secured thereto in any well-known manner. At the outer end of the pipe 12 the outer casing member 10 is provided with a threaded boss 29 to which an external outlet pipe (not shown) is adapted to be attached. The threaded portions 16 and 17 respectively on the inner casing and the base of the cup-shaped portion of the cover 18 form a trap screw, and by means of a tool applied to the lug or ground key 20 on the upper face of the cover the trap screw may be opened or closed. The rotation of the collar 23 about the member 21 is prevented by the projection 30 on the member 21 extending into the slot 31 on the said collar 23.

In Fig. 1 the seal is shown below the water, the level of which is indicated at *xx*. In operation, water entering the inlet pipe 11 passes upward until it reaches the water shield 24 which retards the flow, and any circular motion of the water which might be created is retarded by means of the blades or partitions 25. The water then passes over the water shield 24 through the elongated openings or slits 26 into the upper end 28 of the pipe 12.

The collar 23 is loosely mounted upon the tubular member 21 and the position of this collar 23 and its water shield 24 is adjusted automatically according to the pressure of the water upon said water shield and the elongated openings 26 are automatically reduced and enlarged thereby varying with the pressure the volume of water permitted to pass into the outlet pipe. When the cover 18 is removed the trap is free from all obstructions and can be easily cleaned.

It is to be understood that this invention is not limited to the specific details of construction shown in the accompanying drawings, but that these may be varied in the carrying out of the invention. It is also to be understood that the combinations specifically set forth in the several claims are intended to be separately claimed without limitation to the use in connection therewith of other features and details of construction illustrated.

It is believed that the operation and many advantages of the invention will be fully understood from the foregoing description.

Having thus described my invention, I claim:

1. In an anti-siphon trap, a body portion, an inlet-pipe, an outlet-pipe, an inverted cup, and means extending from the base of the cup down into the trap for retarding the flow of water and preventing any consequent siphonage.

2. In an anti-siphon trap, an outer-casing, an inlet-pipe, an outlet-pipe, an inverted cup having a downwardly extending portion, a collar and a water shield having a plurality of blades carried by the collar.

3. In an anti-siphon trap, an outer-casing, an inlet-pipe, an outlet-pipe, an inverted cup having a downwardly extending portion, a collar and a water shield carried by the collar provided on its under side with a plurality of blades.

4. In an anti-siphon trap, a body portion, an inlet-pipe, an outlet-pipe, an inverted cup having a downwardly extending portion provided with a plurality of elongated openings, and a water shield provided on its under side with a plurality of blades.

5. In an anti-siphon grease trap, a body portion, an inlet-pipe, an outlet-pipe, a cup having a downwardly extending portion extending into the body portion and provided with a plurality of elongated openings whereby the downwardly extending portion serves as a strainer, and an automatic water shield for retarding the flow of water and preventing siphonage, automatically adjusting itself to the pressure of any water in the trap and which reduces and enlarges automatically the openings in the downwardly extending portion of the cup thereby varying with the pressure the volume of water permitted to pass into the outlet pipe.

6. In an anti-siphon trap, a casing, an inlet-pipe, an outlet-pipe, an inverted cup having a downwardly extending portion within the casing provided with elongated openings, a water shield provided with a plurality of blades, and means for holding the shield upon the said downwardly extending portion and preventing rotary movement thereof.

7. In an anti-siphon trap, an inlet-pipe, an outlet-pipe, an inverted cup fitted over the upper end of said outlet pipe and provided with openings above said end, and a collar surrounding said cup and having a flanged extension, said collar being normally below said openings but adapted to partially close them by the pressure of the water against said extension.

8. In an anti-siphon trap, an inlet-pipe, an outlet-pipe, an inverted cup fitted over the upper end of said outlet pipe and provided with openings above said end, and a collar surrounding said cup and having a flanged extension connected to said collar by radial blades, said collar being normally below said openings but adapted to partially close them by the pressure of the water against said extension.

9. In an anti-siphon trap, an outer casing, an inlet-pipe, an outlet-pipe, a cover, a depending strainer member removably secured to said cover and fitted over the upper end of said outlet-pipe, and means surrounding and movable endwise of said strainer member for varying the operation thereof.

10. In an anti-siphon trap, an outer casing, an inlet-pipe, an outlet-pipe, a cover, a depending strainer member removably secured to said cover and fitted over the upper end of said outlet-pipe, and means surrounding and movable endwise of said strainer member by the flow of water and adjustably varying the discharge through said outlet-pipe.

Signed by me at 4 Post Office Sq., Boston, Mass., this 9th day of May, 1914.

THOMAS E. CROSBY.

Witnesses:
WALTER E. LOMBARD,
EDWARD F. ALLEN.

Copies of this patent may be obtained for five cents each, by addressing the "Commissioner of Patents, Washington, D. C."